(12) United States Patent
Koretsky

(10) Patent No.: US 6,717,869 B2
(45) Date of Patent: Apr. 6, 2004

(54) INTEGRATED CIRCUIT HAVING REDUNDANT, SELF-ORGANIZED ARCHITECTURE FOR IMPROVING YIELD

(75) Inventor: Victor Koretsky, Raanana (IL)

(73) Assignee: D.S.P. Group Ltd., Herzelia Pituach (IL)

( * ) Notice: Subject to any disclaimer, the term of this patent is extended or adjusted under 35 U.S.C. 154(b) by 0 days.

(21) Appl. No.: 10/134,090

(22) Filed: Apr. 25, 2002

(65) Prior Publication Data

US 2003/0202388 A1 Oct. 30, 2003

(51) Int. Cl.[7] .................................................. G11C 7/00
(52) U.S. Cl. .............................. 365/200; 365/226
(58) Field of Search .............................. 365/200, 226, 365/201

(56) References Cited

U.S. PATENT DOCUMENTS

| | | | | |
|---|---|---|---|---|
| 4,654,846 A | * | 3/1987 | Goodwin et al. .............. 371/8 |
| 4,941,087 A | * | 7/1990 | Kap .............................. 364/200 |
| 5,313,424 A | | 5/1994 | Adams et al. ................ 365/200 |
| 5,495,447 A | * | 2/1996 | Butler et al. .................. 365/200 |
| 5,568,061 A | * | 10/1996 | McClure ........................ 326/13 |
| 5,754,556 A | * | 5/1998 | Ramseyer et al. ........... 371/10.3 |
| 5,795,797 A | * | 8/1998 | Chester et al. .................. 438/4 |
| 6,011,748 A | | 1/2000 | Lepejian et al. .............. 365/233 |
| 6,018,812 A | * | 1/2000 | Deyst, Jr. et al. ............ 714/724 |
| 6,041,000 A | * | 3/2000 | McClure et al. .............. 365/200 |

* cited by examiner

*Primary Examiner*—Michael Tran
(74) *Attorney, Agent, or Firm*—Nath & Associates PLLC

(57) ABSTRACT

An integrated circuit architecture having a common circuit including a system controller and a data bus coupled to a plurality of redundant processing units, or clusters, each adapted to perform self-diagnosis and to report a status thereof to the system controller via a status line. The system controller is adapted to disconnect a faulty or unresponsive cluster from the common circuit in order to allow normal operation of remaining operative components. By such means yield of the integrated circuit is increased as well as the reliability of a device containing the integrated circuit.

19 Claims, 4 Drawing Sheets

INTEGRATED CIRCUIT HAVING REDUNDANT, SELF-ORGANIZED ARCHITECTURE FOR IMPROVING YIELD

FIELD OF THE INVENTION

This invention relates to an integrated circuit architecture and method of production for improving the percentage yield of good components.

BACKGROUND OF THE INVENTION

It is known that defects randomly spread over the area of a semiconductor wafer cause a chip (or integrated circuit) having such defects that is removed from the wafer during the manufacturing process to be rejected upon test. A percentage of good integrated circuits out of total number manufactured in the wafer is referred to as the yield. Typically, defects are spread evenly over the area of semiconductor wafer and are characterized by so-called defect density, which varies as a function of manufacturing process maturity, process geometry, sensitivity, chip density, and so on. For example, the finer the process geometry, the lower is the yield per unit area; the more sensitive the integrated circuit is to process variance, the lower is the yield. Likewise, yield decreases as the integrated circuit density increases. For this reason, memory areas have lower yield than logic areas, since the memory cell is the densest element of the integrated circuit.

As a result, as the size and density of an integrated circuit increase, the probability of a defect being found on the integrated circuit becomes higher, and this results in fewer integrated circuits being serviceable after manufacture. This increases the cost of a good integrated circuit, since it needs to cover the cost of those many others with defects.

Moreover, high performance integrated circuits required for Very Large Scale of Integration (VLSI) (high capacity memory devices), or those required for powerful processing (multi-processor arrays) are very expensive, regardless of yield considerations. However, their per-unit price clearly increases even more as yield falls.

It is known to provide integrated circuits containing memory chips with redundant memory cells so as to allow external testing, whereby the memory array is tested so as to identify faulty memory components and to replace these with functional components.

For example, U.S. Pat. No. 5,313,424 entitled "Module level electronic redundancy" discloses a redundancy system formed on a semiconductor chip, which includes circuits for testing a memory array to locate a faulty element therein, a register for storing an address of the faulty element and electrical fuses blown in response to binary digits of the address stored in the register upon application of an enable signal from a single input to the semiconductor chip. The enable signal passes through logic circuits on the chip such that the fuses cannot be programmed or blown unless the enable signal is present. An address decoder coupled to outputs from the fuses substitutes a redundant element for the faulty element.

U.S. Pat. No. 6,011,748 entitled "Method and apparatus for built-in self test of integrated circuits providing for separate row and column addresses" discloses a BIST (Built-In Self-Test) function in which both the row address and the column address of a memory to be tested may be selected independently. Addresses to be tested may be selected flexibly so as to improve transition time between rows, allowing determination of which memory address passes or fails the test.

In order to improve the yield of VLSI integrated circuits (ICs), different techniques of redundant manufacturing are used for very high integration level of memory devices. Such techniques as described, for example, in above-mentioned U.S. Pat. Nos. 5,313,424 and 6,011,748, provide for ICs to be manufactured with spare memory cells, which, in turn, replace defective ones, either during integrated circuit testing (permanently) or during built-in self test (BIST) operation (on-the-fly). However, no techniques have been proposed so far to extend this concept to multi-processor ICs.

It would clearly be an advantage to provide a multi-processor integrated circuit where self-testing is an inherent feature of the chip's architecture that may be used both to increase yield and also reliability of the integrated circuit.

SUMMARY OF THE INVENTION

It is therefore an object of the invention to provide a multi-processor integrated circuit where self-testing and self-organization are inherent features of the chip's architecture.

This object is realized in accordance with a first aspect of the invention by a method for increasing the yield and/or reliability of an integrated circuit having a common circuit, said method comprising:

(a) connecting to the common circuit a plurality of mutually redundant clusters each having a respective processing unit and associated auxiliary components, and (b) self-testing the respective processing unit in each cluster, and (c) disconnecting a faulty or unresponsive cluster from the common circuit SO that failure of one cluster does not cause failure of the integrated circuit.

According to a second aspect of the invention, there is provided an integrated circuit architecture comprising:

a common circuit including a system controller and a data bus coupled to a plurality of redundant processing units, or clusters, each adapted to perform self-diagnosis and to report a status thereof to the system controller via a status line;

said system controller being adapted to disconnect a faulty or unresponsive cluster from the common circuit in order to allow normal operation of remaining operative components.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Figure 1:
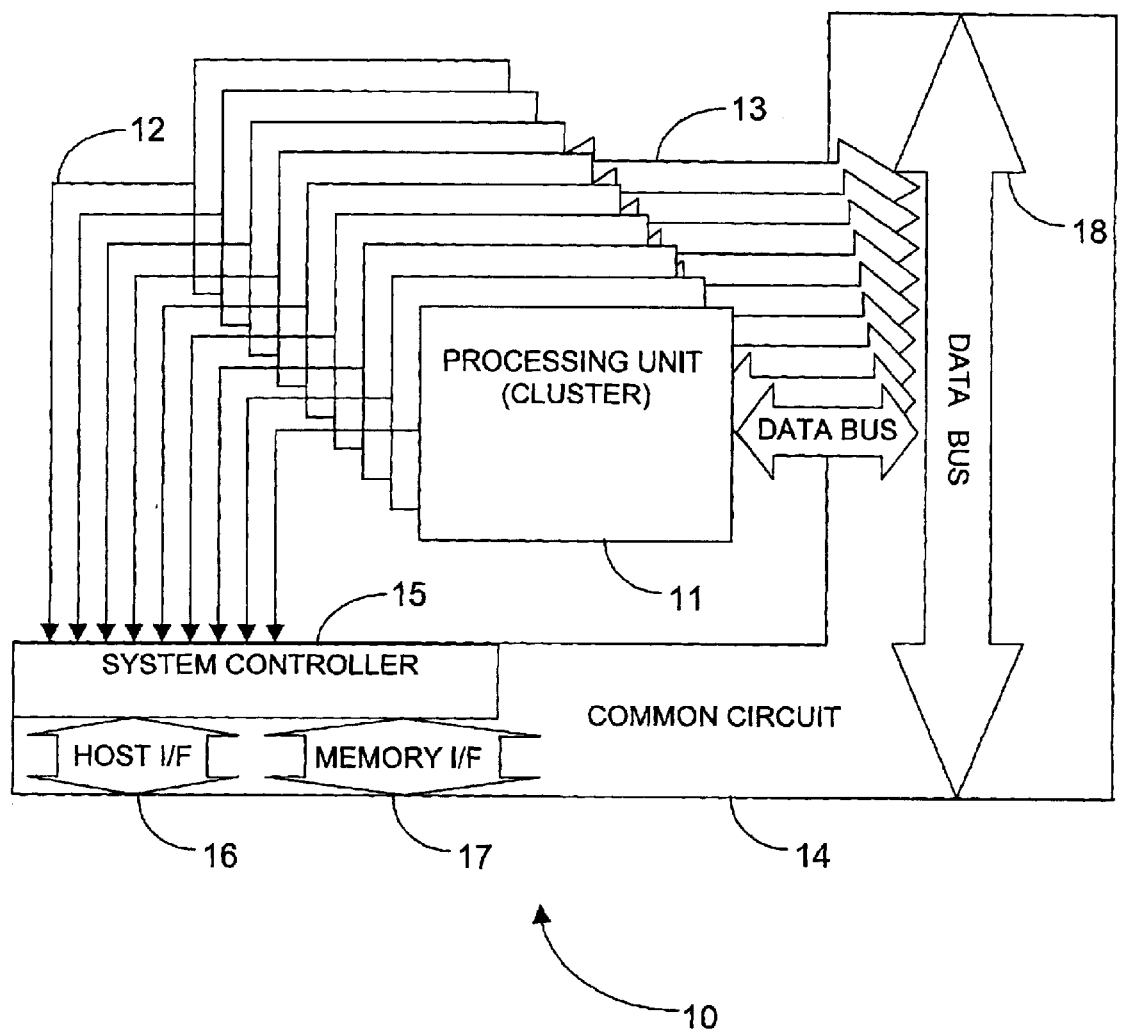
FIG. 1 is a block diagram showing schematically a very large scale integrated circuit having an array of processing units according to the invention.
Figure 2:
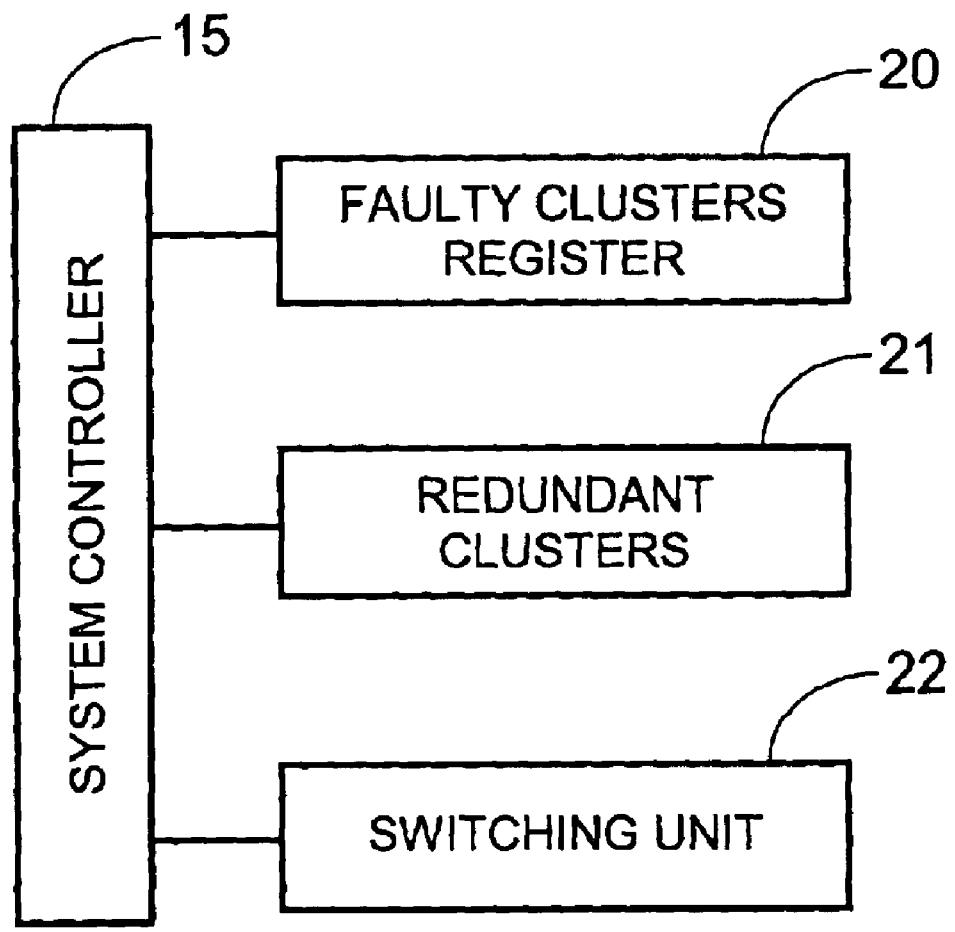
FIG. 2 is a block diagram showing auxiliary components that are used in conjunction with the circuit shown in FIG. 1 for increasing its reliability.

Thus, referring to FIGS. 1 and 2, there is shown schematically a very large scale integrated circuit 10, whose circuit architecture comprises multiple identical or similar processing units, or clusters 11, each having a respective status line 12 and data bus 13, connected to a common circuit 14. The common circuit 14 comprises a system controller 15 with its external host and memory interfaces 16 and 17, respectively, and a common data bus 18, to which all the respective data buses 13 of the clusters 13 are connected. The system controller 15 maintains a faulty clusters register 20 of any clusters that are disconnected, as well as a redundant clusters register 21 of redundant functional clusters that are not connected. A switching unit 22 connected to the system controller 15 and controlled thereby serves to disconnect faulty and/or unresponsive clusters and to connect available redundant clusters in their place. One way in which this can be done is described below with reference to FIG. 4 of the drawings.

Principle of Operation

Such a distributed processing architecture having redundant processing units, allows for some amount of defective clusters to be ignored while nevertheless qualifying the integrated circuit as good for normal operation. For this purpose, the number of clusters 11 that is provided during manufacture is intentionally larger than that needed for normal operation, so as to allow for faulty clusters to be ignored during testing after manufacture and even upon occurrence of a malfunction during normal lifetime operation. By such means, the reliability or mean time between failures (MTBF) is increased since a failure of an active cluster does not imply failure of the complete integrated circuit 10.

Figure 3:
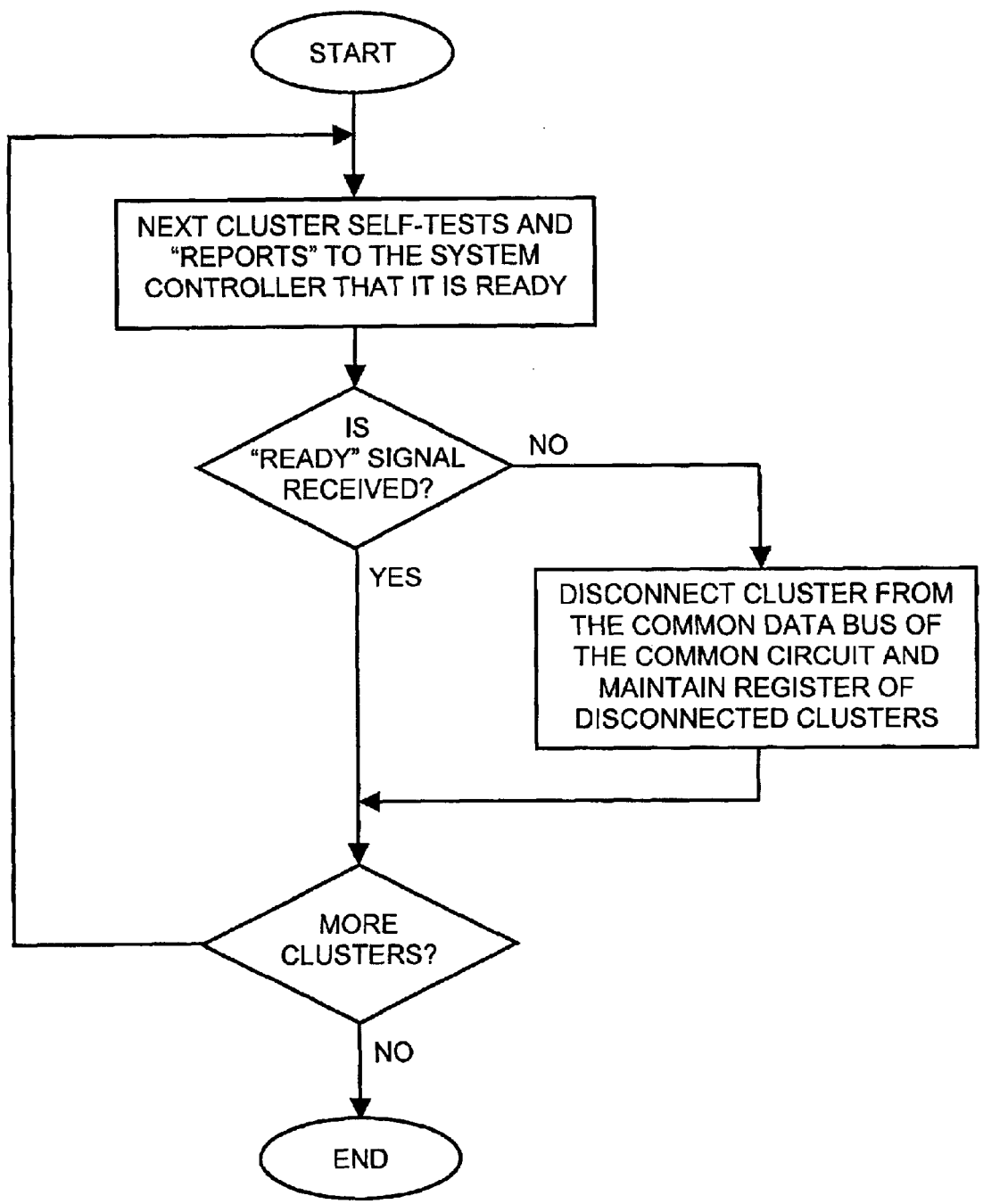
FIG. 3 is a flow diagram showing the principal steps in a method for self-testing the integrated circuit shown in FIG. 1.

Having described the integrated circuit architecture, the self-test process will now be described with reference to FIG. 3 of the drawings. During each initialization process, which starts whenever power is turned on, each cluster 11 tests itself and "reports" to the system controller 15 that it is ready, via a dedicated or common status line 12. Clusters that report as not ready, or that fail to report at all, are considered by system controller as defective, and their respective data buses 13 are disconnected from the common data bus 18 of the common circuit 14, in order not to prevent normal operation of other, good, clusters.

Disconnection can be initiated either under control of the system controller 15 or directly by a faulty cluster, depending in part on the severity of a fault. In either case, the system controller 15 may direct a cluster to initiate a self-test and report the test result to the system controller 15; or a cluster can initiate a self-test alone on power-up, without intervention of the system controller 15. However, in the case of a total failure in a cluster that renders communication with the system controller impossible, the system controller 15, upon receiving no response within a predetermined time interval, disconnects the unresponsive cluster from the common circuit 14. This requires that the cluster be flagged as unusable in an internal register (not shown) maintained by the system controller 15; and that the data bus 13 to this cluster be disconnected from the common data bus 18.

On the other hand, if the nature of the fault is such that the faulty cluster is able to report back to the system controller 15, then either the system controller 15 can disconnect the cluster (as explained above), or the faulty cluster can self-disconnect. Again, the system controller 15, on receiving the failure report from the faulty, albeit responsive, cluster flags the cluster as unusable.

The integrated circuit 10 may be configured so that on power-up, the system controller 15 automatically prompts each cluster to initiate self-test and report back to the system controller 15. Alternatively, each cluster may initiate self-test on power-up. In both cases, the clusters are tested from scratch on power-up. However, in accordance with another embodiment, an internal register may be maintained on a non-volatile memory in which clusters found to be faulty or unresponsive are flagged as unusable. On power-up, the system controller 15 checks the internal register and configures the integrated circuit architecture so that the faulty or unresponsive clusters are disconnected. This obviates the need to retest all the clusters each time power is first fed to the integrated circuit 10. On the other hand, this does not derogate from the ability of each cluster to initiate periodic self-testing, or to be responsive to a fault, in order to re-configure the integrated circuit 10 in the event of a failure during operation of a device based on the integrated circuit 10, as explained in more detail below.

In order to achieve the necessary disconnection, the respective data buses 13 of each cluster may be connected to the common data bus 18 via a MOSFET switch (not shown) that is opened or closed under control of the system controller 15. By such means, clusters identified as unusable may simply be bypassed whenever power is applied to the integrated circuit 10.

Not only does this increase yield, but the integrated circuit architecture according to the invention also improves reliability of the integrated circuit, i.e. mean time between failures (MTBF) of a device system based on such an integrated circuit. Thus, as explained above, whenever power is applied to the integrated circuit 10, the system controller 15 initiates the self-test procedure described above. A previously functional cluster that is now identified as being faulty is disconnected and a redundant parallel cluster that is functional is substituted therefor. This requires task redistribution by the software which manages the chip, so that the operational load is "spread" among all available clusters in order that maximum capacity is always guaranteed. It thus follows that the number of working clusters can be higher than needed, but never lower.

Such task redistribution may also be achieved by connecting a redundant functional cluster that is not initially connected. In such case, if during operation the instant load is low, the system controller 15 can disconnect most of the clusters, keeping just that number connected that are necessary to carry the load. For example, if there are 100 clusters, each capable of supporting ten communication channels, but an active request is made for only four channels, then the system controller 15 will shut down all but one cluster. The remaining 99 clusters are redundant but also functional and their respective identities may therefore be stored in the redundant clusters register 21.

Figure 4:
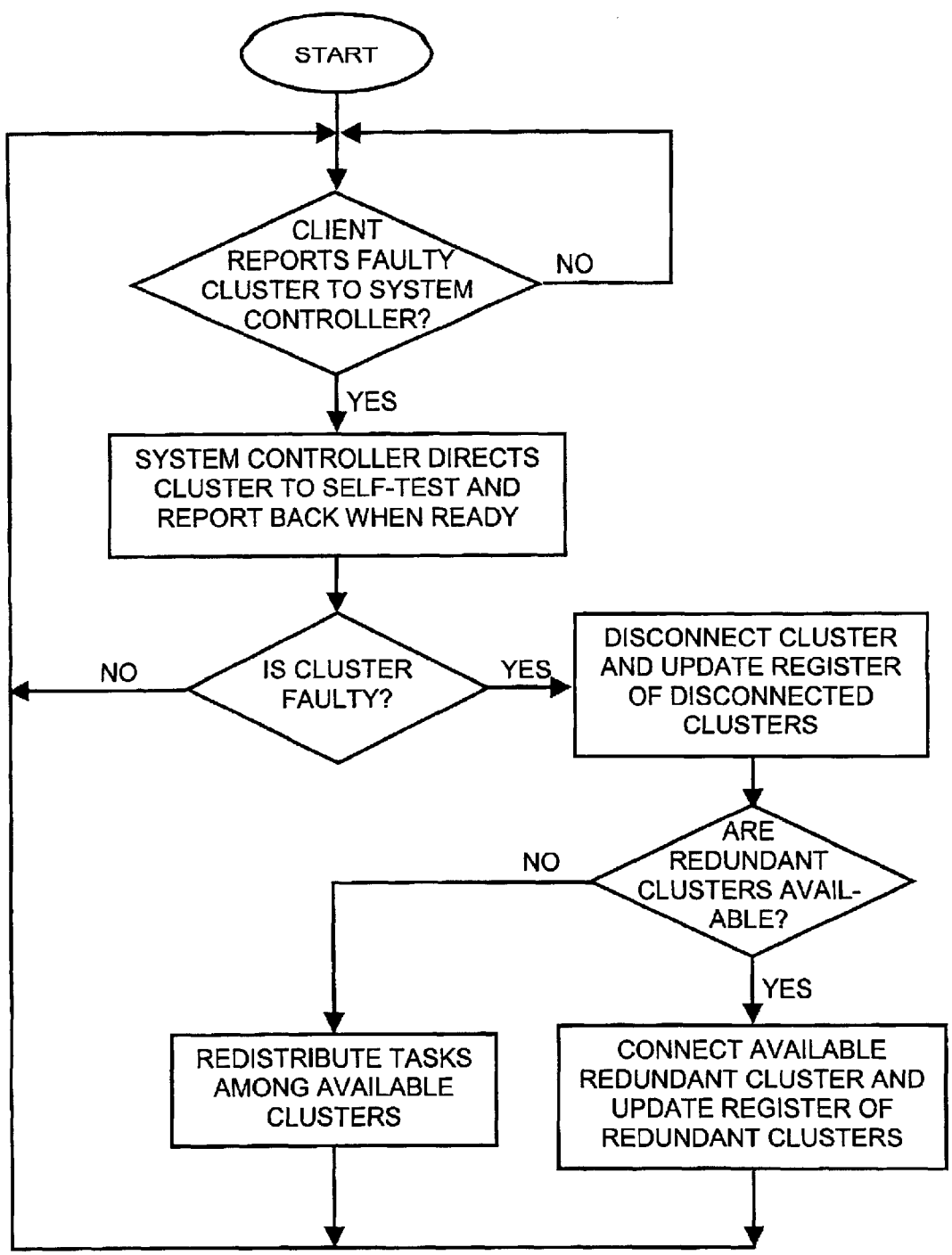
FIG. 4 is a flow diagram showing the principal steps in a method for testing the integrated circuit during operation so as to increase its reliability.

FIG. 4 is a flow diagram showing one possible approach as to how a cluster that fails during operation of a client device using the integrated circuit may be replaced on-the-fly, thus preventing failure of the integrated circuit and increasing the MTBF. Thus, if the client detects a mal-operation in a cluster, it reports this to the system controller 15, which then either assumes that the cluster in question is faulty or verifies that this is the case by directing the cluster to initiate a self-test and report back the result to the system controller. If the cluster is faulty or if it is unresponsive, which amounts to the same thing, then the system controller 15 feeds the identity of the faulty cluster to the switching unit 22, which disconnects the faulty cluster. The system controller 15 also adds the identity of the faulty cluster to the faulty clusters register 20.

The system controller then checks in the redundant clusters register 21 whether there are any available redundant clusters that can be substituted for the faulty cluster. If so, then an available redundant cluster is connected and its identity is removed from the redundant clusters register 21. If not, then the system controller 15 redistributes the tasks among the available clusters.

What is claimed is:

1. A method for increasing the yield and/or reliability of an integrated circuit having a common circuit, said method comprising:
   (a) connecting to the common circuit a plurality of mutually redundant clusters each having a respective processing unit and associated auxiliary components,
   (b) self-testing the respective processing unit in each cluster, and
   (c) disconnecting a faulty or unresponsive cluster from the common circuit so that failure of one cluster does not cause failure of the integrated circuit.

2. The method according to claim 1, wherein steps (b) and (c) include:
   i) successively self-testing each cluster and reporting a status thereof to a system controller, and
   ii) the system controller disconnecting a faulty or unresponsive cluster from the common circuit.

3. The method according to claim 1, wherein steps (b) and (c) include:
   i) successively self-testing each cluster and reporting a status thereof to a system controller,
   ii) the system controller disconnecting a faulty and unresponsive cluster from the common circuit, and
   iii) a faulty and responsive cluster self-disconnecting from the common circuit.

4. The method according to claim 2, wherein the system controller is responsive to initiation of power on for controlling each of the clusters successively to perform said self-diagnosis.

5. The method according to claim 3, wherein the system controller is responsive to initiation of power on for controlling each of the clusters successively to perform said self-diagnosis.

6. The method according to claim 2, wherein an active cluster is adapted to self-test during operation of a device containing said integrated circuit and to self-disconnect upon failure and a redundant cluster is either substituted therefor or tasks are re-distributed among remaining operational clusters.

7. The method according to claim 3, wherein an active cluster is adapted to self-test during operation of a device containing said integrated circuit and to self-disconnect upon failure and a redundant cluster is either substituted therefor or tasks are re-distributed among remaining operational clusters.

8. An integrated circuit architecture comprising:
   a common circuit including a system controller and a data bus coupled to a plurality of redundant processing units, or clusters, each adapted to perform self-diagnosis and to report a status thereof to the system controller via a status line;
   said system controller being adapted to disconnect a faulty or unresponsive cluster from the common circuit in order to allow normal operation of remaining operative components.

9. The integrated circuit architecture according to claim 8, wherein the system controller is responsive to initiation of power on for controlling each of the clusters successively to perform said self-diagnosis.

10. The integrated circuit architecture according to claim 8, wherein the status line is a common status line serving each of the clusters.

11. The integrated circuit architecture according to claim 8, wherein each cluster is provided with a respective status line.

12. The integrated circuit architecture according to claim 8, wherein the data bus includes a common data bus switchably coupled to a plurality data buses to each of which a respective one of the clusters is connected, thereby allowing the data bus in respect of a faulty cluster to be disconnected from the common data bus.

13. The integrated circuit architecture according to claim 8, wherein a faulty and responsive cluster is adapted to self-disconnect and report to the system controller.

14. An integrated circuit architecture comprising:
    a common circuit including a common data bus switchably coupled to a plurality of redundant processing units, or clusters, each via a respective data bus and each cluster and its associated data bus adapted for disconnection from the common circuit if found to be faulty and to provide a fault status thereof to the common circuit via a status line;
    wherein the common circuit is responsive to initiation of power on for controlling each of the clusters successively to perform self-diagnosis.

15. An integrated circuit architecture comprising:
    a common circuit including a common data bus switchably coupled to a plurality of redundant processing units, or clusters, each via a respective data bus and each cluster and its associated data bus adapted for disconnection from the common circuit if found to be faulty and to provide a fault status thereof to the common circuit via a common status line serving each of the clusters.

16. An integrated circuit architecture comprising:
    a common circuit including a common data bus switchably coupled to a plurality of redundant processing units, or clusters, each via a respective data bus and each cluster and its associated data bus adapted for disconnection from the common circuit if found to be faulty and to provide a fault status thereof to the common circuit via a respective status line coupled to the common circuit.

17. An integrated circuit architecture comprising:
    a common circuit including a common data bus switchably coupled to a plurality of redundant processing units, or clusters, each via a respective data bus and each cluster and its associated data bus adapted for disconnection from the common circuit if found to be faulty and to provide a fault status thereof to the common circuit;
    wherein a faulty and responsive cluster is adapted to self-disconnect and report to the common circuit.

18. An integrated circuit architecture comprising:
    a common circuit including a common data bus switchably coupled to a plurality of redundant processing units, or clusters, each via a respective data bus and each cluster and its associated data bus adapted for disconnection from the common circuit if found to be faulty and to provide a fault status thereof to the common circuit;

wherein the common circuit is adapted to disconnect a faulty and unresponsive cluster a predetermined time interval after requesting a self-test.

19. An integrated circuit architecture comprising:

a common circuit including a common data bus switchably coupled to a plurality of redundant processing units, or clusters, each via a respective data bus and each cluster and its associated data bus adapted for disconnection from the common circuit if found to be faulty and to provide a fault status thereof to the common circuit;

wherein the clusters are adapted to self-test during operation of a device containing said integrated circuit and to self-disconnect a cluster from the common circuit upon failure thereof.

* * * * *